Patented Feb. 17, 1948

2,436,361

UNITED STATES PATENT OFFICE 2,436,361

PLASTIC COMPOSITIONS OF MATTER

Lucas P. Kyrides, Webster Groves, Mo., assignor to Monsanto Chemical Company, St. Louis, Mo., a corporation of Delaware No Drawing. Application May 15, 1937, Serial No. 142,801

2 Claims. (Cl. 106—181)

This invention relates to plastic compositions for use in the manufacture of films, lacquers, varnishes, molding compositions, filaments, etc., and it deals particularly with a novel class of plasticizers characterized in that they are esters of dicarboxylic acids containing an aliphatic hydrocarbon group and an aliphatic ketone group. It is a continuation-in-part of my abandoned copending application, Serial No. 604,660, filed on April 11, 1932.

Various materials are employed in the manufacture of plastic compositions, among which may be mentioned the cellulose esters and ethers, notably nitrocellulose, acetyl cellulose, benzoyl cellulose, benzyl cellulose, etc.; natural gums such as shellac, dammar, etc.; resinous polymers such as polystyrene; as well as synthetic gums and resins, including urea-aldehyde condensation products, phenol-aldehyde condensation products and polyhydric alcohol-polybasic acid condensation products which are modified advantageously with other acids and other alcohols.

In general when these compositions are employed as coating compositions it is customary to dissolve the products in a suitable volatile solvent and admix therewith various ingredients which form a permanent part of the final product and which modify the properties of the final product. Thus, in the manufacture of cellulose nitrate plastics, esters such as ethyl acetate and butyl acetate are employed as volatile solvents; dibutyl phthalate and tricresyl phosphate are employed as plasticizing compositions which form a more or less permanent portion of the film or final coating composition and which impart desirable qualities to the film. In an analogous manner acetone is employed as a volatile solvent for cellulose acetate; triphenyl phosphate and dimethyl phthalate are employed as fire retarding and plasticity imparting constituents respectively which form a permanent part of the final product.

The choice of solvents and plasticity imparting constituents varies widely to meet with economic and technological exigencies. The art of formulating and proportioning the solvents, plasticizers and modifying ingredients, including dyes, pigments and fire retardants, involves questions of choice and experience within the knowledge of those skilled in the art.

The object of this invention is to provide a novel class of organic plasticizers which have been found to possess inordinately strong solvent power for cellulose esters, as well as a large variety of resins, and to impart desirable properties to the ultimate product.

A further object of the invention is to provide a novel class of organic compositions whose properties may be varied over a comparatively wide range in order to fulfill specific requirements in the plastic arts.

I have found that esters of dicarboxylic acids, corresponding to esters in which one carboxyl group of the dicarboxylic acid has been esterified by an aliphatic alcohol and the other has been esterified by an aliphatic ketone alcohol, are valuable solvents for plastic compositions indicated above.

It has been proposed heretofore to employ salacetol, which is the acetonyl ester of salicylic acid as a camphor substitute in the manufacture of cellulose nitrate plastics. However, this material is unsatisfactory since it gives almost immediate evidence of decomposition and marked discoloration when incorporated with nitrocellulose. It has now been found that the acetonyl radical in and of itself is probably not responsible for the discoloration and decomposition but, on the contrary, these esters of acetonyl alcohol and its homologues are valuable solvent and plasticizing ingredients provided they contain no free phenol group nor an amino group. Thus, for example, ethyl acetonyl phthalate exhibits remarkable solvent and plasticizing power for cellulose nitrate and does not discolor the film even after prolonged exposure to light conditions which bring about almost immediate decomposition in the case of salacetol. Moreover, it has been found that this same class of compositions possesses remarkable solvent action for cellulose acetate and it has been found possible to form a cellulose acetate film containing equal parts by weight of ethyl acetonyl phthalate and cellulose acetate without evidence of discoloration or separation.

The plasticizing products contemplated by the present invention are formed conveniently by condensing chloroacetone with a metallic salt of a half alkyl ester of a dicarboxylic acid, for example, monoethyl phthalic acid. They correspond to esters resulting from esterification of one carboxyl group of the acid by an aliphatic alcohol and the other carboxyl group of the acid by an aliphatic ketone alcohol. For convenience in naming the compounds, the compounds are designated generally as alkyl-alkanonyl esters of dicarboxylic acids, in extension of the rules of the Commission on the Reform of the Nomenclature of Organic Chemistry. According to these rules, ketones are named as alkanones, thus acetone is 2-propanone and ethyl methyl ketone is 2-butanone. The acetonyl radical ($CH_3COCH_2$—) is well recognized and need not be changed to the 2-propanonyl radical, but the radicals resulting from the higher ketones are most conveniently named by this terminology, thus the radicals resulting from methyl ethyl ketone are called butanonyl radicals, and the general radical of the form —RCOR is called an alkanonyl radical. The general formula of the alkyl-alkanonyl esters contemplated by the invention is—

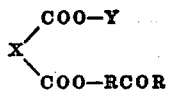

in which Y is an alkyl group, RCOR is an alkanonyl group and X is an alkyl, aryl, cycloalkyl or aralkyl hydrocarbon residue.

The method of preparing the plasticizing compounds forms no part of the present invention. The compounds themselves and their method of preparation are more completely described in my copending application, Serial No. 130,530, filed on March 12, 1937, which has issued as Patent No. 2,119,993. Ethyl acetonyl phthalate is a typical compound of the invention and a preferred method for its preparation is the following:

*Example 1—Ethyl acetonyl phthalate.*—One-half mol of phthalic anhydride (74 grams) is partially esterified with absolute ethyl alcohol (100 cc.) by heating under gentle reflux for three hours. To the mixture are then added 40 grams of 50% sodium hydroxide solution (½ mol) and 48 grams (slightly more than ½ mol of chloroacetone) and the mixture is agitated and heated under gentle reflux for an additional three hours. A greater excess of anhydrous ethanol facilitates the esterification and such excess is preferred.

The excess alcohol and unreacted materials are removed by distillation under reduced pressure and the residual oil is washed successively with sodium carbonate solution and water. The oil is then distilled in vacuum. The boiling point of the ethyl acetonyl phthalate is 164°–168° C. at a pressure of 5 mm. of mercury; it begins to distill at 320°–327° C. (with decomposition) at atmospheric pressure. The refractive index of the purified compound is 1.5103 at 24.5° C.

The yield can be improved if the sodium salt of the monoethyl ester of phthalic acid as prepared above is first recovered and dried before reaction with the chloroacetone. In this case additional absolute ethyl alcohol is added as diluent to the mixture before heating with chloroacetone.

Further improvement in the yield can be obtained by forming the sodium salt of the monoethyl phthalate by adding anhydrous sodium carbonate or potassium carbonate to the previously-refluxed mixture of phthalic anhydride and absolute alcohol and by refluxing the mixture after addition of chloroacetone for a longer period.

Although monochloroacetone is the simplest and most common type of chlorinated ketone, the compounds contemplated by the invention comprise those also resulting from the homologues of chloroacetone, such as those derived from methyl ethyl ketone, diethyl ketone and ethyl propyl ketone. There is only one monochloroacetone but when methyl ethyl ketone or higher ketones are chlorinated a number of isomeric chloroalkanones results. These can be separated and used in pure form for the preparation of the esters, or the isomeric mixture can be used, the esters in that case being a mixture of isomers. For the preparation of esters for use as plasticizers these isomeric mixtures of chloroalkanones yield esters substantially as satisfactory as those resulting from the pure individual isomers.

The alcohols or alkyl carbinols which may be used for the partial esterification of the dicarboxylic acid may be monohydric alcohols or etherified polyhydric alcohols having a free alcoholic hydroxy group. Suitable hydroxy compounds are methyl alcohol, propyl alcohol, isopropyl alcohol, the butyl alcohols and higher homologues, monoethers of glycols and diethers of glycerol, all of which for the purpose of the present invention are equivalents. The esterification of the carboxyl group of the acid may, of course, be effected by the use of other methods, as is well known.

The dicarboxylic acids or anhydrides which are contemplated for the production of esters for use in the invention include aliphatic as well as aromatic acids and anhydrides which contain no hydroxyl or amino group detrimental to the use contemplated by the invention. These acids and anhydrides include succinic, maleic, adipic, diglycolic, thiodiglycolic, sebacic and phthalic acids and anhydrides derived therefrom.

The high-boiling solvents or plasticizers contemplated for use in the invention are employed in a manner analogous to that of present-day high-boiling solvents and plasticizers such as dibutyl phthalate, tricresyl phosphate, etc. Typical examples of methods for employing these substances follow:

*Example 2.*—A nitrocellulose lacquer may be prepared in accordance with the present invention by dissolving nitrocellulose in a suitable low-boiling solvent mixture, for example, a mixture containing 25% by volume of ethyl acetate or butyl acetate, and 20% by volume of ethyl alcohol or butyl alcohol, and 55% by volume of benzene, toluene, or a similar hydrocarbon solvent. To this solution is then added about 30% to 50%, based on the weight of the nitrocellulose, of ethyl acetonyl phthalate. Gums and pigments may be added if desired. When coated on a surface, this composition leaves, upon evaporation of the solvent, a flexible and tough film which contains the phthalate as a permanent constituent.

Nitrocellulose retains up to an equal weight of ethyl acetonyl phthalate without sweating.

*Example 3.*—A cellulose acetate film is made in a manner analogous to that described in Example 2, by dissolving cellulose acetate in acetone and adding 30% of its weight of ethyl acetonyl phthalate. The residual film obtained upon evaporation of the acetone will be found to be clear, flexible, and tough. In the absence of the ethyl acetonyl phthalate, the cellulose acetate film is relatively brittle and lacking in toughness.

The retentivity of cellulose acetate for ethyl acetonyl phthalate is very good, up to an equal weight being retained without sweating. The resistance of cellulose acetate films containing ethyl acetonyl phthalate to discoloration by light is very good.

*Example 4.*—An alkyd resin formed by reacting glycerol with phthalic anhydride and a drying oil acid such as is obtained from linseed oil is dissolved in a petroleum naphtha and benzene solvent mixture, after which n-butyl-acetonyl phthalate in a proportion corresponding to 30% of the weight of the resin is added. The resulting coating composition is employed in the usual manner. This coating composition deposits films which on elimination of the volatile solvents, possess a marked degree of toughness and flexibility.

*Example 5.*—If desired, the plasticizing substances contemplated by the present invention may be employed in baking varnishes and in molding compositions. As an example of a composition for the latter purpose, a phenol-formaldehyde resin which is in a thermoplastic state is fluxed by the application of heat, after which 15% of its weight of n-butyl butanonyl diglycolate is added thereto. The resulting composition is mixed thoroughly in order to produce a homogeneous mass and is then rendered infusible by the application of heat, as is well understood by those skilled in the art.

In general, the plasticizers of the invention are characterized as liquids or solids of low melting point, of light color, and high boiling point. They have an inordinate solvent power for and compatibility with cellulose esters and ethers and alkyd resins, phenol-formaldehyde resins, and styrene resins. Compositions containing these plasticizers are characterized by exceptional stability to heat and light, to which they can be subjected for great periods without discoloration. The water solubility and the rate of hydrolysis of the alkyl alkanonyl esters is low. For representative alkyl-alkanonyl phthalates the degree of hydrolysis by boiling with water for the indicated periods is as follows:

| Period | Ethyl acetonyl phthalate | Ethyl butanonyl phthalate | n-Butyl acetonyl phthalate |
|---|---|---|---|
|  | Per cent | Per cent | Per cent |
| 0 hrs | | 0.012 | 0.01 |
| 2 hrs | 0.12 | 0 038 | 0.07 |
| 4 hrs | 0.18 | 0.063 | 0.09 |
| 6 hrs | 0.19 | 0.088 | 0.10 |

The plasticizers herein described may be used as the sole substances for accomplishing this purpose or they may be used in admixture with other known plasticizers such as dibutyl phthalate or triphenyl or tricresyl phosphate with which they are compatible.

Attention is drawn to my copending application, Serial No. 130,531, filed on March 12, 1937, which has issued as Patent No. 2,228,666, in which are described compositions comprising vinyl resins, which compositions are characterized by an inordinate flexibility that is retained at low temperatures.

From the foregoing description it will be apparent that the invention is susceptible to many modifications within the knowledge of those skilled in the art and that the invention is not limited to the examples specifically set forth but rather contemplates the utilization of a specific class of neutral alkyl-alkanonyl esters of a dicarboxylic acid, as plasticizers.

I claim:

1. A composition embodying a cellulose derivative and containing, as a plasticizer, ethyl acetonyl phthalate.

2. A composition embodying a cellulose ester and containing, as a plasticizer, ethyl acetonyl phthalate.

LUCAS P. KYRIDES.

REFERENCES CITED

The following references are of record in the file of this patent:

UNITED STATES PATENTS

| Number | Name | Date |
|---|---|---|
| 2,005,414 | Dykstra | June 18, 1935 |